Dec. 14, 1948. L. J. BRONAUGH ET AL Re. 23,058
REFRIGERATOR
Original Filed Feb. 16, 1931
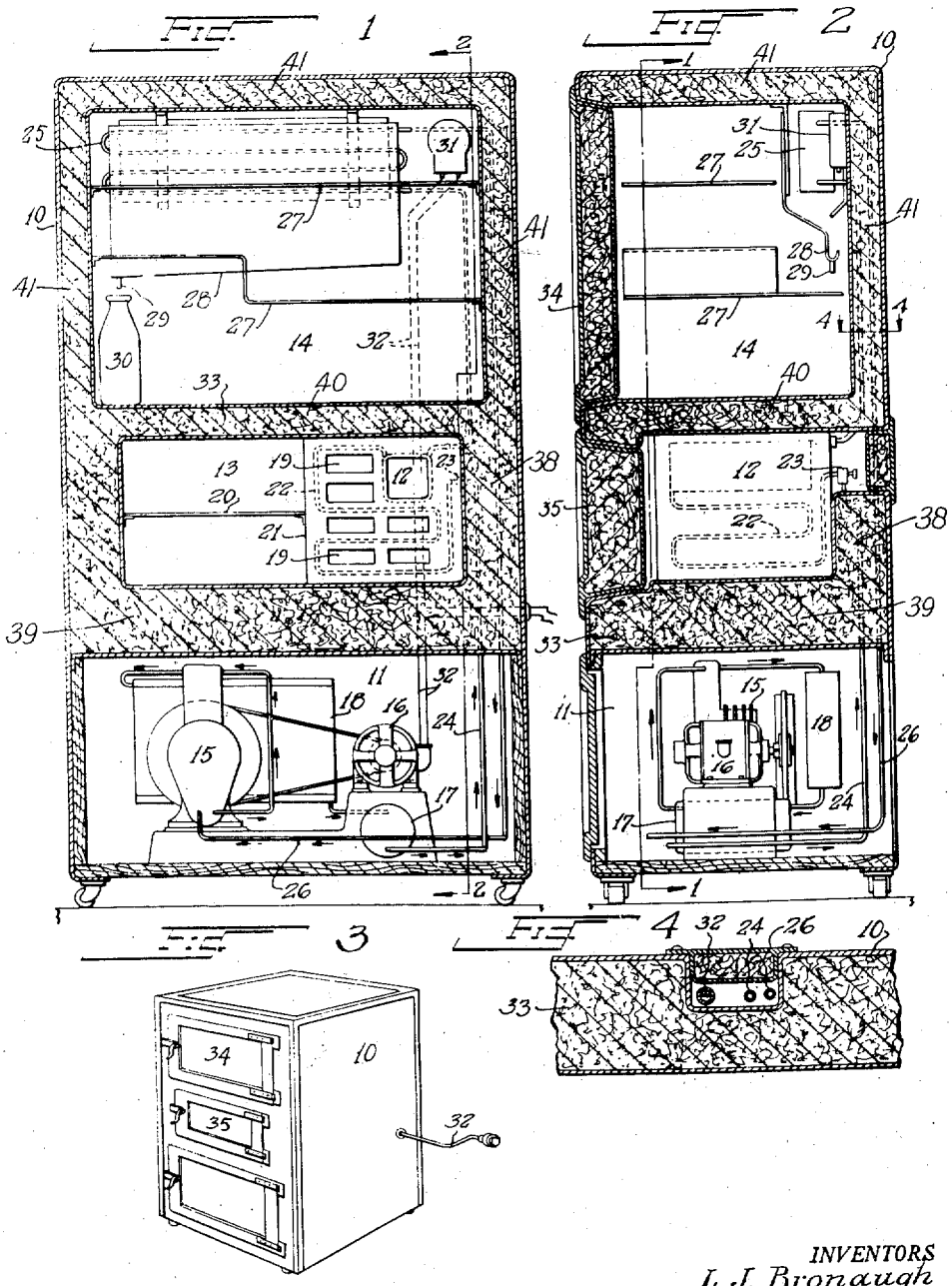
INVENTORS
L. J. Bronaugh
T. I. Potter
BY Richard S. Temko
ATTORNEY Reissued Dec. 14, 1948

Re. 23,058

UNITED STATES PATENT OFFICE 23,058

REFRIGERATOR

Lewis J. Bronaugh, Portland, Oreg., and Thomas I. Potter, New York, N. Y., assignors, by direct and mesne assignments, to Refrigeration Patents Corporation, Buffalo, N. Y., a corporation of New York Original No. 2,056,165, dated October 6, 1936, Serial No. 516,032, February 16, 1931. Application for reissue June 18, 1948, Serial No. 33,876

4 Claims. (Cl. 62—116)

This invention relates generally to the art of refrigeration, and particularly to a new form of refrigerator.

The main object of this invention is the design of a refrigerator which will make it possible at one and the same time and over long or short periods of time to perform several highly desirable tasks, namely to form ice or freeze desserts quickly, to provide cold storage for frozen meat and food stuffs, and to provide storage for food at temperatures above freezing.

The second object is to construct a cabinet in which the ice-making or freezing unit is thermally insulated from the food storage department.

The third object is the construction of a refrigerator which is not a compromise between a quick freezing refrigerator and one which is ideal for food storing, but which will possess both of these properties in maximum quantities.

The fourth object is to provide a refrigerator having its heat pumping action controllable by food compartment temperatures and in which the efficiency of the freezing unit will be increased as the rate of heat pumping from the food department increases.

The fifth object is to secure the utmost simplicity in the control of the heat pumping action, and to render unnecessary adjustments of the heat pumping apparatus to meet the various requirements of the present-day household.

The sixth object is to adapt the refrigerator to the rapidly increasing practice of buying the food stuffs in frozen form, and uninterruptedly maintaining this frozen condition until the food is prepared for use.

The seventh object is to eliminate completely all defrosting and objectionable drying out of the foods.

The eighth object is to make it possible for the householder to utilize all of the advantages obtainable from varying degrees of refrigeration heretofore only possible in large commercial plants.

Before entering into a description of this invention it must be understood that while mechanical refrigeration has many advantages over the ice box used by our ancestors, it has many limitations which are greatly magnified in the smaller sizes of refrigerating units, especially of the type used in the home. These limitations and requirements have been increased rather than decreased by the advent of the use of frozen food stuffs, which render it imperative that the frozen food remains frozen until it is prepared for use.

Obviously, a refrigerator which must be periodically defrosted is unsuitable for the preservation of this class of food.

Again, there are, generally speaking, two classes of food which are put into a refrigerator; first, food requiring merely to be kept cool—that is, above freezing, and in most cases having a relatively high rate of evaporation. Second, food having a relatively low rate of evaporation and which should be maintained at temperatures well below freezing. In addition to this, comes the ever increasing demand for the ability to form ice and freeze desserts quickly.

It follows that the designer of a refrigerating machine soon finds himself compromising between a quick freezing machine and one which is best adapted for the storage of food. If the temperature of the food storage compartment falls too low as the result of an attempt to provide quick freezing the consequence is a rapid drying out of the food. To offset this certain manufacturers provide a cover for the food to prevent its drying out and impose upon the user the necessity of frequently adjusting the controls to obtain the kind of refrigeration desired. It is easily seen that an adjustment of controls to suit varying conditions (several of which may exist at the same time) does not solve the problem. In the refrigerator about to be described no adjustment of controls is necessary.

These, and other objects, will become more apparent from the specification following as illustrated in the accompanying drawing, in which:

Fig. 1 is a vertical section taken along the line 1—1 in Fig. 2.

Fig. 2 is a vertical section taken along the line 2—2 in Fig. 1.

Fig. 3 is a perspective view of the cabinet.

Fig. 4 is a section taken along the line 4—4 in Fig. 2.

Similar numbers of reference refer to similar parts throughout the several views.

Referring in detail to the drawing, there is shown a cabinet having four separate and distinct compartments contained within an outer casing 10. These consist of a chamber or compartment 11, a freezing compartment 12, a cold storage compartment 13 and a food storage compartment 14. The chamber or compartment 11 contains any desirable form of heat pumping unit which, in this instance, includes a compressor 15 which is belt driven by a motor 16. There is also provided the usual receiver 17 and condenser 18.

The freezing compartment 12 is preferably a brine tank and includes suitable freezing trays 19. Adjacent to the freezing compartment 12 is a cold storage compartment 13 which is provided with one or more shelves 20. Heat is permitted to flow freely from the cold storage compartment 13 through the wall 21 to the freezing compartment 12, but the compartments 12 and 13 may not draw heat from any other portion of the refrigerator. The freezing compartment or brine tank, contains an expansion coil 22 which will be referred to as a freezing coil, and which is provided with the expansion valve 23. The coil 22 draws refrigerant from the receiver 17 through the high pressure refrigerant line 24. The food storage compartment 14 is provided with a cooling coil 25 which draws refrigerant from the discharge of the freezing coil 22 and returns same through the pipe 26 to the compressor 15.

The compartment 14 may have any number of divisions and shelves 27 and contains a drip collecting shelf 28 by means of which condensed moisture from the cooling coil 25 is collected and drained through an outlet 29, either into a container 30 (as shown) or into a waste pipe. The food storage compartment 14 contains a temperature-actuated motor controlling switch 31 which is placed in the motor circuit 32 and is set to operate the compressor 15 whenever the temperature of the food storage compartment rises above the desired temperature, which, in this case, will be assumed to be forty degrees. The expansion valve 23 is set to permit a flow of refrigerant into the freezing coil 22, which will provide a temperature approximating zero, while the temperature in the cold storage compartment 13 will be in the neighborhood of twenty degrees.

These relative values are of course dependent upon the various controlling factors and are given only to permit a clearer understanding of the invention and the objects attained thereby. Any suitable insulating material 33 is employed in the construction of the cabinet, and the compartment 14 and combined compartments 12 and 13 are provided with doors 34 and 35 packed with insulation material.

The requisite difference of temperature between the cooling compartment 14 and the cold storage compartment 13, can be maintained with the greatest economic efficiency by not only providing a proper ratio of the cooling elements for said compartments, but also by providing a proper relation of the insulation of the two compartments. It will be understood that there is no such thing as a perfect heat insulator and that a certain amount of heat is always flowing into a refrigerator compartment from the surrounding atmosphere (provided, of course, that the surrounding atmosphere is warmer than that of the refrigerator compartment). A heat insulator may thus be more properly termed a "heat impedance" because all it does is to retard the flow of heat and the rate of heat flow through a heat insulator of given quality and thickness depends upon the temperature head. Since very low temperatures are to be maintained in compartments 12 and 13 it is important that they be thoroughly heat insulated. In other words, the heavier the insulation the better and the only limitation to the efficiency of such insulation is that imposed by questions of bulk, and expense. As shown in the drawing, compartments 12 and 13 are separated from the outside atmosphere by thick rear and side walls 38 and also by a thick door 35 so that the heat flow into said compartments is reduced to a minimum. Since the chamber 11 under the compartments 12 and 13 contains the apparatus for pumping heat out of the refrigerator, this compartment would naturally be warmer than the outside atmosphere and consequently a wall 39 is provided which is even thicker than the walls 38 to insulate the chambers against heat pumped into and generated in the compartment 11. The temperature drop between the cooling compartment 14 and compartments 12 and 13 is comparatively much smaller and hence a thinner wall 40 furnishes sufficient resistance to heat flow into compartments 12 and 13 out of compartment 14. The walls 41 and door 34 separating the cooling compartment 14 from the outside atmosphere are thinner than the walls 38 and door 35, as shown. This difference of wall thickness is provided not as a measure of economy but because it is desired to maintain a higher temperature in compartment 14 than in compartments 12 and 13 by permitting a greater heat flow into compartment 14.

As indicated above it makes no difference how low the temperature falls in chambers 12 and 13, but the range of temperatures permissible in compartment 14 is more critical. Foods kept in compartment 14 must not be frozen and the moisture saturation point of the air in compartment 14 should not be lowered to such an extent as to dry out the foods; hence it is important to hold the temperature in said compartment well above the freezing point and yet low enough to prevent the food therein from spoiling. We have found that a temperature of about 40° Fahrenheit is very satisfactory under most conditions; but some other normal temperature may be selected provided it is above the freezing point. Whatever the temperature selected, it is obvious that it should be maintained without any great degree of variation and for this reason the control of the heat pumping system is preferably made to depend upon the temperature in the chamber 14 and the thermostat 31 is placed in chamber 14 rather than either of the other chambers. If the insulation of chamber 14 were as heavy as that of the other chambers the temperature in the compartment 14 might remain for a long period unvaried and in the meantime the temperature might be raised considerably in chambers 13 and 12, by opening the door 35 or by introducing warm foods therein, without in the least affecting the thermostat 31 and hence without operating the heat pumping unit. Thus the temperature ratio between the several compartments would be disturbed and could not be restored until the heat pumping unit was restarted. Since, however, the insulation separating chamber 14 from the outside atmosphere is so proportioned that the rate of ambient heat flow into chamber 14 is greater than into chambers 12 and 13, the intervals between operations of the heat pumping unit is reduced and thus more frequently are the relative temperatures of the several chambers reestablished. It will be understood, of course, that because of the series connection of the cooling elements the heat will be pumped out of compartments 12 and 13 through the cooling element 25 so that said compartments must be reduced to the desired temperature before the compartment 14 will be chilled sufficiently for the thermostat 31 to stop the operation of the heat pumping plant.

While the thermostat 31 controls the temperature of the compartment 14 the setting of the expansion valve 23 controls the temperature of compartments 12 and 13. As the expansion valve is adjusted to restrict the discharge of refrigerant the pressure differential in the refrigerant circuit is increased, lowering the temperature of the coil 22 and that of compartments 12 and 13, until they reach their respective minima, corresponding to the valve setting. The refrigerant will be completely vaporized in coil 22 until the temperatures of the compartments near said minima, when some of the refrigerant will reach the coil 25 in liquid form, and, by vaporizing therein, will cool compartment 14. Thus, by our system the compartments 12 and 13 must first be cooled to minima fixed by the setting of the expansion valve before compartment 14 can be cooled to a minimum set by the thermostat. This arrangement whereby one temperature is controlled by a thermostat and another by an expansion valve is a novel feature of our invention.

By proportioning the insulation to offer greater resistance to inflow of heat into the cooling compartment 14 than into the cold storage compartment 13, a more uniform temperature can be obtained in the latter compartment. Were the insulation of the two chambers of the same heat-resistant quality and thickness, the rate of inflow into the cold storage compartment would be greater, by reason of the greater temperature drop between the outside atmosphere and the cold storage compartment than between the outside atmosphere and the cooling compartment. The heat pumping unit, after pulling down the temperatures of the two compartments to their respective predetermined heat levels would then be stopped by actuation of the thermostat in the cooling chamber. Thereafter, the temperature in the cold storage chamber would climb faster than that in the cooling chamber because of the greater head of ambient heat impressed on the insulation of the cold storage chamber. Hence, there would be a marked rise in temperature in the freezing compartment before the temperature in the cooling compartment would rise sufficiently to actuate the thermostat. This difficulty we have overcome by proportioning the heat impedance of the walls to the heat head they must oppose and while such proportioning results incidentally in economy of material, it has for its primary object to maintain a more uniform temperature in the cold storage compartment as well as in the freezing compartment which is thermally connected therewith.

From the foregoing it will be seen that there is provided a refrigerator having a non-frosting food storage compartment in which food may be held at desirable temperatures without undue evaporation. Secondly, that quick freezing for ice and desserts is ever available. Thirdly, that there is provided uninterrupted cold storage at freezing temperatures, and lastly, that the necessity for regulating the control system is entirely eliminated since a wide range of temperatures is provided simultaneously, and further, that not only is the necessity for defrosting eliminated entirely, but also the evaporation of the food stuffs is reduced to a minimum.

The articles placed in the cold storage compartment are those not giving off much moisture, and whatever moisture does find its way into the cold storage compartment, either by evaporation or by opening the door thereof, will be deposited as snow rather than as ice, due to the low temperature prevailing in the compartment 13. In other words, there is no objectionable frosting in the cold storage compartment, for the reason above stated, and no frosting in the cooling compartment since the temperature maintained there is above freezing. There may, of course, occur a slight amount of frosting where the cooling coil 25 enters the compartment 14.

Another factor of great value found in this arrangement resides in the fact there the more the cooling compartment is used the greater will be the efficiency of the cold storage and freezing compartments.

By arranging the compartments as illustrated with the cooling chamber 14 which is the one most used, at the top of the cabinet, access may be had to this compartment without stooping, while the intermediate compartments 12 and 13 are also elevated by placing them above the compartment 11, so that the various food chambers are arranged to provide maximum convenience in actual service.

What is claimed is:

1. A household refrigerator which in normal operation provides above-freezing moist cold air for preserving in a refrigerated condition foods susceptible to moisture loss by evaporation and below-freezing dry cold air and a dry cold surface for preserving foods in a frozen condition, said refrigerator comprising a cabinet having a cooling compartment and a freezing compartment, thermal insulation around said compartments thermally insulating said compartments from each other and from the outside atmosphere, air in said cooling compartment having a substantially stable temperature of about 40° F. and having a humidity whose relative value is at least 100% at 32° F., air in said freezing compartment having a temperature well below 32° F., a cooling refrigerant expander having heat-conducting surfaces within said cooling compartment and constructed and arranged to maintain its heat-conducting surfaces at a temperature above 32° F. while withdrawing heat from said compartment to maintain said air in said cooling compartment at said substantially stable temperature, a freezing refrigerant expander having heat-conducting surfaces within said freezing compartment and constructed and arranged to maintain its heat-conducting surfaces at a temperature well below 32° F. while withdrawing heat from said compartment, volatile refrigerant in said expanders, a single liquefying unit associated with said expanders and constructed and arranged to condense refrigerant expanded by heat extracted by said expanders from both said compartments, the volatile refrigerant circulating through said expanders being the sole heat-extracting medium, and a thermostat responsive to the temperature in one of said compartments controlling the operation of said liquefying unit.

2. A household refrigerator which in normal operation provides above-freezing moist cold air for preserving in a refrigerated condition foods susceptible to moisture loss by evaporation and below-freezing dry cold air and a dry cold surface for preserving foods in a frozen condition, said refrigerator comprising a cabinet having a cooling compartment and a freezing compartment, thermal insulation around said compartments thermally insulating said compartments from each other and from the outside atmosphere, a cooling refrigerant expander having heat-conducting surfaces within said cooling compartment and constructed and arranged to maintain its heat-conducting surfaces at a temperature above 32° F. while withdrawing heat from said compartment, whereby air in said cooling compartment is cooled thereby to a temperature above 32° F. and is maintained at a humidity whose relative value is at least 100% at 32° F., a freezing refrigerant expander having heat-conducting surfaces within said freezing compartment and constructed and arranged to maintain its heat-conducting surfaces at a temperature well below 32° F. while withdrawing heat from said compartment whereby air in said freezing compartment is cooled thereby to a temperature well below 32° F., volatile refrigerant in said expanders, a single liquefying unit associated with said expanders and constructed and arranged to condense refrigerant expanded by heat extracted from both said compartments, the volatile refrigerant circulating through said expanders being the sole heat-extracting medium, and a thermostat responsive to the temperature in one of said compartments controlling the operation of said liquefying unit.

3. A household refrigerator which in normal operation provides above-freezing moist cold air for preserving in a refrigerated condition foods susceptible to moisture loss by evaporation and below-freezing dry cold air and a dry cold surface for preserving foods in a frozen condition, said refrigerator comprising a cabinet having a cooling compartment and a freezing compartment, thermal insulation around said compartments thermally insulating said compartments from each other and from the outside atmosphere, air in said cooling compartment having a substantially stable temperature whose value is about 40° F. and having a humidity whose relative value is at least 100% at 32° F., air in said freezing compartment having a temperature well below 32° F., a cooling refrigerant expander having heat-conducting surfaces within said cooling compartment and constructed and arranged to maintain its heat-conducting surfaces at a temperature above 32° F. while withdrawing heat from said compartment to maintain said air in said cooling compartment at said substantially stable temperature, a freezing refrigerant expander having heat-conducting surfaces within said freezing compartment and constructed and arranged to maintain its heat-conducting surfaces at a temperature well below 32° F. while withdrawing heat from said compartment at its temperature well below 32° F., volatile refrigerant in said expanders, a single liquefying unit associated with said expanders and constructed and arranged to condense refrigerant expanded by heat extracted by said expanders from both said compartments, the volatile refrigerant circulating through said expanders being the sole heat-extracting medium, a thermostat responsive to the temperature in said cooling compartment and controlling the on-off cycles of said liquefying unit in response to variation of said temperature, and the thermal insulation around said cooling compartment offering less resistance to flow of heat thereto from the outside atmosphere than does the thermal insulation of the freezing compartment to insure starting of said liquefying unit by heat flow into said cooling compartment during an off cycle of said liquefying unit before the temperature in said freezing compartment approaches a non-freezing value.

4. A household refrigerator which in normal operation provides above-freezing moist cold air for preserving in a refrigerated condition foods susceptible to moisture loss by evaporation and below-freezing dry cold air and a dry cold surface for preserving foods in a frozen condition, said refrigerator comprising a cabinet having a cooling compartment and a freezing compartment, thermal insulation around said compartments thermally insulating said compartments from each other and from the outside atmosphere, a cooling refrigerant expander having heat-conducting surfaces within said cooling compartment and constructed and arranged to maintain its heat-conducting surfaces at a temperature above 32° F. while withdrawing heat from said compartment, whereby air in said cooling compartment is cooled thereby to a temperature above 32° F. and is maintained at a humidity whose relative value is at least 100% at 32° F., a freezing refrigerant expander having heat-conducting surfaces within said freezing compartment and constructed and arranged to maintain its heat-conducting surfaces at a temperature well below 32° F. while withdrawing heat from said compartment whereby air in said freezing compartment is cooled thereby to a temperature well below 32° F., volatile refrigerant in said expanders, a single liquefying unit associated with said expanders and constructed and arranged to condense refrigerant expanded by heat extracted from both said compartments, the volatile refrigerant circulating through said expanders being the sole heat-extracting medium, a thermostat responsive to the temperature in said cooling compartment and controlling the on-off cycles of said liquefying unit in response to said temperature, and the thermal insulation around said cooling compartment offering less resistance to flow of heat thereto from the outside atmosphere than does the thermal insulation of the freezing compartment to insure starting of said liquefying unit by heat flow into said cooling compartment during an off cycle of said liquefying unit before the temperature in said freezing compartment approaches a non-freezing value.

LEWIS J. BRONAUGH.
THOMAS I. POTTER.

REFERENCES CITED

The following references are of record in the file of this patent:

UNITED STATES PATENTS

| Number | Name | Date |
|---|---|---|
| Re. 17,078 | Davenport | Sept. 11, 1928 |
| 1,185,597 | Eddy | May 30, 1916 |
| 1,371,235 | Case et al. | Mar. 15, 1921 |
| 1,439,051 | Anderson | Dec. 19, 1922 |
| 1,711,553 | Von Platen et al. | May 7, 1929 |
| 1,728,183 | King | Sept. 17, 1929 |
| 1,731,711 | Davenport | Oct. 15, 1929 |
| 1,734,127 | Hamilton | Nov. 5, 1929 |
| 1,746,896 | Hunt | Feb. 11, 1930 |
| 1,769,112 | Davenport | July 1, 1930 |
| 1,769,117 | Davenport | July 1, 1930 |
| 1,775,989 | Dennison | Sept. 16, 1930 |
| 1,779,409 | Chilton | Oct. 28, 1930 |
| 1,798,951 | Munters | Mar. 31, 1931 |
| 1,806,019 | Muffly | May 19, 1931 |
| 1,867,748 | Maccabee | July 19, 1932 |
| 1,900,510 | Maccabee | Mar. 7, 1933 |
| 1,909,875 | Lundgaard | May 16, 1933 |
| 1,910,853 | Munters | May 23, 1933 |
| 1,921,865 | Curtis | Aug. 8, 1933 |
| 1,983,766 | Maccabee | Dec. 11, 1934 |
| 2,002,389 | Barnes | May 21, 1935 |